United States Patent
Sedarat

(10) Patent No.: US 7,421,015 B2
(45) Date of Patent: Sep. 2, 2008

(54) BIT-LOADING IN MULTICARRIER COMMUNICATION SYSTEMS IN THE PRESENCE OF AN ASYMMETRIC, CORRELATED GAUSSIAN NOISE SOURCES

(75) Inventor: Hossein Sedarat, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 621 days.

(21) Appl. No.: 10/789,552

(22) Filed: Feb. 26, 2004

(65) Prior Publication Data

US 2005/0190825 A1 Sep. 1, 2005

(51) Int. Cl.
*H04B 1/38* (2006.01)

(52) U.S. Cl. .................... 375/222; 375/260

(58) Field of Classification Search ............... 375/222, 375/224, 260, 284, 285, 346
See application file for complete search history.

(56) References Cited

U.S. PATENT DOCUMENTS

| | | | |
|---|---|---|---|
| 4,679,227 A | 7/1987 | Hughes-Hartogs | |
| 5,285,474 A | 2/1994 | Chow et al. | |
| 5,768,473 A * | 6/1998 | Eatwell et al. | 704/226 |
| 5,844,940 A | 12/1998 | Goodson et al. | |
| 5,909,178 A * | 6/1999 | Balch et al. | 340/572.4 |
| 6,006,083 A | 12/1999 | Tong et al. | |
| 6,161,209 A * | 12/2000 | Moher | 714/780 |
| 6,433,819 B1 * | 8/2002 | Li et al. | 348/180 |
| 6,633,545 B1 * | 10/2003 | Milbrandt | 370/252 |
| 6,721,394 B1 * | 4/2004 | Murphy et al. | 379/22.08 |
| 6,738,418 B1 * | 5/2004 | Stiscia et al. | 375/222 |
| 6,859,488 B2 | 2/2005 | Azenkot et al. | |
| 6,999,507 B2 * | 2/2006 | Jin | 375/224 |
| 7,035,661 B1 * | 4/2006 | Yun | 455/522 |
| 7,155,007 B1 * | 12/2006 | Upton | 379/392.01 |
| 2002/0044597 A1 * | 4/2002 | Shively et al. | 375/222 |
| 2003/0048368 A1 * | 3/2003 | Bosco et al. | 348/272 |
| 2003/0099285 A1 * | 5/2003 | Graziano et al. | 375/220 |
| 2003/0099286 A1 * | 5/2003 | Graziano et al. | 375/222 |

(Continued)

OTHER PUBLICATIONS

Tesei et al ("Application to locally optimum detection of a new noise model", Acoustics, Speech, and Signal Processing, 1996. ICASSP-96. Conference Proceedings, 1996 IEEE International Conference, May 7-10, 1996, vol. 5 pp. 2467-2470).*

(Continued)

*Primary Examiner*—David C. Payne
*Assistant Examiner*—Leon-Viet Q Nguyen
(74) *Attorney, Agent, or Firm*—Blakely, Sokoloff, Taylor & Zafman LLP

(57) ABSTRACT

In general, various methods and apparatus are described that use a multi-tone receiver. The multi-tone receiver detects data in a multiple tone signal. The receiver has a detector module to measure a noise power level present in the system and to detect for an asymmetric Gaussian noise source in the background noise. An equivalent noise power is obtained by applying a compensating gain factor to the asymmetrical noise source. The gain factor is used when the detector indicates that the asymmetric Gaussian noise source exists in the background noise. Any bit-loading algorithm that is based on a symmetric Guassian noise source assumption can also be used with asymmetrical Guassian noise sources if this gain factor is applied.

20 Claims, 5 Drawing Sheets

U.S. PATENT DOCUMENTS

| | | |
|---|---|---|
| 2004/0066865 A1 | 4/2004 | Yousef et al. |
| 2004/0091025 A1 | 5/2004 | Sindhushayana et al. |
| 2004/0156441 A1* | 8/2004 | Peeters et al. ............... 375/260 |
| 2005/0047514 A1* | 3/2005 | Bolinth et al. .............. 375/261 |
| 2005/0111561 A1 | 5/2005 | Sedarat et al. |
| 2005/0169357 A1 | 8/2005 | Sedarat |
| 2005/0190825 A1 | 9/2005 | Sedarat |
| 2006/0062379 A1 | 3/2006 | Sedarat et al. |
| 2006/0067388 A1 | 3/2006 | Sedarat |
| 2006/0083321 A1 | 4/2006 | Sedarat |
| 2006/0222098 A1 | 10/2006 | Sedarat et al. |
| 2006/0253515 A1 | 11/2006 | Sedarat |

OTHER PUBLICATIONS

U.S. Appl. No. 10/721,445, Office Action dated Jan. 26, 2007, 8 pages.
U.S. Appl. No. 10/721,445, Office Action dated Jul. 26, 2007, 8 pages.
U.S. Appl. No. 10/773,054, Office Action dated Apr. 20, 2007, 4 pages.
U.S. Appl. No. 10/773,054, Office Action dated Sep. 19, 2007, 9 pages.
Franklin, Curt, "How DSL Works," How Stuff Works, http://computer.howstuffworks.com/dsl.htm/printable, printed Nov. 16, 2004.
Sedarat, Hossein, et al., "Impulse Noise Protection for Multi-Carrier Communication Systems", Submitted to IEEE ICASSP (2005).
Sedarat, Hossein, et al., "Multicarrier Bit-Loading in Presence of Biased Gaussian Noise Sources", IEEE Consumer Communication and Networking Conference, Jan. 2005.
Baccarelli, Enzo, et al., Novel Efficient Bit-Loading Algorithms for Peak-Energy-Limited ADSL-Type Multicarrier Systems, IEEE Trans on Signal Processing, vol. 50, No. 5, May 2002.
Sonalkar, Ranjan, et al., "An Efficient Bit-Loading Algorithm for DMT Application," IEEE Comm. Letters, vol. 4, pp.. 80-82, Mar. 2000.
Campello, Jorge, "Optimal Discrete Bit Loading for Multicarrier Modulation Systems," IEEE International Symposium on Information Theory, Aug. 1998, Cambridge, MA.
Chow, Peter S., et al., "A Practical Discrete Multitone Transceiver Loading Algorithm for Data Transmission over Spectrally Shaped Channels," IEEE Trans. on Communications, vol. 43, No. 2, 1995.
Fischer, Robert F.H., et al., "A New Loading Algorithm for Discrete Multitone Transmission," IEEE, 1996, pp. 724-728.
Lampe, Lutz H.-J., et al., "Performance Evaluation of Non-Coherent Transmission over Power Lines," 8 pgs, 2000.
Henkel, Werner, et al., "Maximizing the Channel Capacity of Multicarrier Transmission by Suitable Adaptation of the Time-Domain Equalizer," IEEE, vol. 48, No. 12, Dec. 2000.
Lashkarian, Navid, et al., "Fast Algorithm for Finite-Length MMSE Equalizers with Application to Discrete Multitone Systems," IEEE 1999, pp. 2753-2756.
Melsa, Peter J.W., et al., "Impulse Response Shortening for Discrete Multitone Transceivers," IEEE vol. 44, No. 12, Dec. 1996, pp. 1662-1672.
Al-Dhahir, Naofal, et al., "Optimum Finite-Length Equalization for Multicarrier Transceivers," IEEE vol. 44, No. 1, Jan. 1996, pp. 56-64.
Leke, Achankeng, et al., "A Maximum Rate Loading Algorithm for Discrete Multitone Modulation Systems," IEEE 1997, pp. 1514-1518.
Bingham, John A.C., "Multicarrier Modulation for Data Transmission: An Idea Whose Time Has Come," IEEE, May 1990, pp. 5-14.
Arslan, G., et al., "Equalization for Discrete Multitone Transceivers to Maximize Bit Rate," IEEE, vol. 49, No. 12, Dec. 2001, pp. 3123-3135.
Farhang-Boroujeny, Behrouz, et al., "Design Methods for Time-Domain Equalizers in DMT Transceivers," IEEE, vol. 49, No. 3, Mar. 2001, pp. 554-562.
Wyglinski, Alexander M., et al., "An Efficient Bit Allocation for Multicarrier Modulation," IEEE Wireless Communication, Networking Conference, Atlanta, GA, Mar. 2004, 4 pgs.
"Draft Standard," Network and Customer Installation Interfaces-Asymmetric Digital Subscriber Line (ADSL) Metallic Interface, Draft American National Standard for Telecommunications, Alliance for Telecommunications Industry Solutions, T1.413-1998.
Krongold, Brian S., et al., "Computationally Efficient Optimal Power Allocation Algorithms for Multicarrier Communication Systems," IEEE Trans. on Communications, vol. 48, pp. 23-27, Jan. 2000.
Barreto, Andre Noll, et al., "Adaptive Bit Loading for Wireless OFDM Systems," IEEE International Symposium on Personal, Indoor and Mobile Radio Communications, Oct. 2001.
Milosevic et al., "Simultaneous Multichannel Time Domain Equalizer Design Based on the Maximum Composite Shortening SNR". Dept. of Electrical and Computer Eng., The University of Texas, Austin Texas, Prior to filing date of current application, pp. 5 total, 2002.
Ana Garcia Armada et al., "Multi-User Constant-Energy Bit Loading for M-PSK-Modulated Orthogonal Frequency Division Multiplexing", © 2002 IEEE, pp. 526-530.
Misao Fukuda et al., "A Line Terminating LSI Using Echo Cancelling Method for ISDN Subscriber Loop Transmission". IEEE Journal on Selected Areas in Communications, vol. 6, No. 3, Apr. 1988, pp. 476-483.
Cheng-Shing Wu et al., "A Novel Cost-Effective Multi-Path Adaptive Interpolated FIR (IFIR)-Based Echo Canceller", © 2000 IEEE, pp. V-453-V-456.
Ranjan V. Sonalkar et al., "Shannon Capacity of Frequency-Overlapped Digital Subscriber Loop Channels", © 2002 IEEE, pp. 1741-1745.
Ivan A. Perez-Alvarez et al., "A Differential Error Reference Adaptive Echo Canceller for Multilevel PAM Line Codes" Work supported by National Project T1C95-0026, © 1996, IEEE, pp. 1707-1710.
Nadeem Ahmed et al., "Optimal Transmit Spectra for Communication in the Presence of Crosstalk and Imperfect Echo Cancellation", Copyright 2001 IEEE, pp. 17-21.

* cited by examiner

US 7,421,015 B2

BIT-LOADING IN MULTICARRIER COMMUNICATION SYSTEMS IN THE PRESENCE OF AN ASYMMETRIC, CORRELATED GAUSSIAN NOISE SOURCES

TECHNICAL FIELD

This disclosure relates generally to communication systems, and more particularly to multicarrier communication in the presence of noise and other sources of error.

BACKGROUND

A Discrete Multi-Tone (DMT) communication system carries information from a transmitter to a receiver over a number of tones. The tones are also commonly referred to as sub-carriers or sub-channels. The transmitter uses a modulation method in which the available bandwidth of a communication channel, such as twisted-pair copper media, is divided into these numerous sub channels.

In the receiver, the data for each sub channel is typically extracted from the time-domain data by taking the Fourier transform of a block of samples from the multi-tone signal. There are various sources of interference and noise in a DMT system that may corrupt the information signal on each tone as it travels through the communication channel and is decoded at the receiver. Because of this signal corruption, the transmitted data may be retrieved erroneously by the receiver. In order to ensure a reliable communication between transmitter and receiver, each tone may carry a limited number of data bits. The number of data bits or the amount of information that a tone carries may vary from tone to tone and depends on the relative power of the information and the corrupting signals on that particular tone.

A reliable communication system is typically defined as a system in which the probability of an erroneously detected data bit by the receiver is always less than a target value. The aggregate sources of corruption associated with each tone are commonly modeled as a single additive noise source with symmetric Gaussian distribution that is added to the information signal on that tone. Under these assumptions, the signal-to-noise power ratio (SNR) becomes a significant factor in determining the maximum number of data bits a tone can carry reliably within a target bit rate error.

The direct relationship between the SNR and the bit rate is based on the key assumption of the symmetry of the Gaussian noise source. However, this assumption may not be completely valid in many practical situations. There are certain types of noise disturbers that cause asymmetry in the distribution of the real and imaginary components of the noise. These noise sources can, for instance, be due to the inter-channel interference from the Nyquist tone—a sub-channel that only carry real component of the signal, or they can be due to ISI of background noise on stop-band frequencies. The effect of these sources become more complicated in a multi-carrier system because the Frequency-Domain Equalizer rotates the signal and correlates the real and imaginary component of noise. The Frequency-Domain Equalizer also assumes that a symmetric Gaussian noise source is present in the background noise. With such a complex source of impairment, SNR alone cannot determine the reliable bit rate. In the presence of an asymmetric Gaussian noise source, a typical bit-loading based on the assumption of symmetry may lead to an actual higher error rate than the target bit rate error.

SUMMARY

In general, various methods and apparatus are described that use a multi-tone receiver. The multi-tone receiver detects data in a multiple tone signal. The receiver has a detector module to measure a noise power level present in the system and to detect for an asymmetric Gaussian noise source in the background noise. An equivalent noise power is obtained by applying a compensating gain factor to the asymmetrical noise source. The gain factor is used when the detector indicates that the asymmetric Gaussian noise source exists in the background noise. Any bit-loading algorithm that is based on a symmetric Guassian noise source assumption can also be used with asymmetrical Guassian noise sources if this gain factor is applied.

DETAILED DESCRIPTION

In the following detailed description of embodiments of the invention, reference is made to the accompanying drawings in which like references indicate similar elements, and in which, by way of illustration, specific embodiments in which the invention may be practiced are shown. These embodiments are understood that logical, mechanical, electrical, functional and other changes may be made without departing from the scope of the present invention. The following detailed description is, therefore, not to be taken in a limiting sense, and the scope of the present invention is defined only by the appended claims.

In general, various methods and apparatus are described that use a multi-tone receiver, such as a DSL modem. The multi-tone receiver detects data in a multiple tone signal. The receiver has a detector module to measure a noise power level present in the system and to detect for an asymmetric Gaussian noise source in the background noise. An equivalent noise power is obtained by applying a compensating gain factor to the asymmetrical noise source. The gain factor is used when the detector indicates that the asymmetric Gaussian noise source exists in the background noise. Any bit-loading algorithm that is based on a symmetric Guassian noise source assumption can also be used with asymmetrical Guassian noise sources if this gain factor is applied.

The equivalent noise power algorithm may alter the measured noise power level to model a noise power level of a symmetric noise source with a radius equal to a major axis of the shape of the distribution of an asymmetric Gaussian noise error in a scatter plot.

Figure 1:
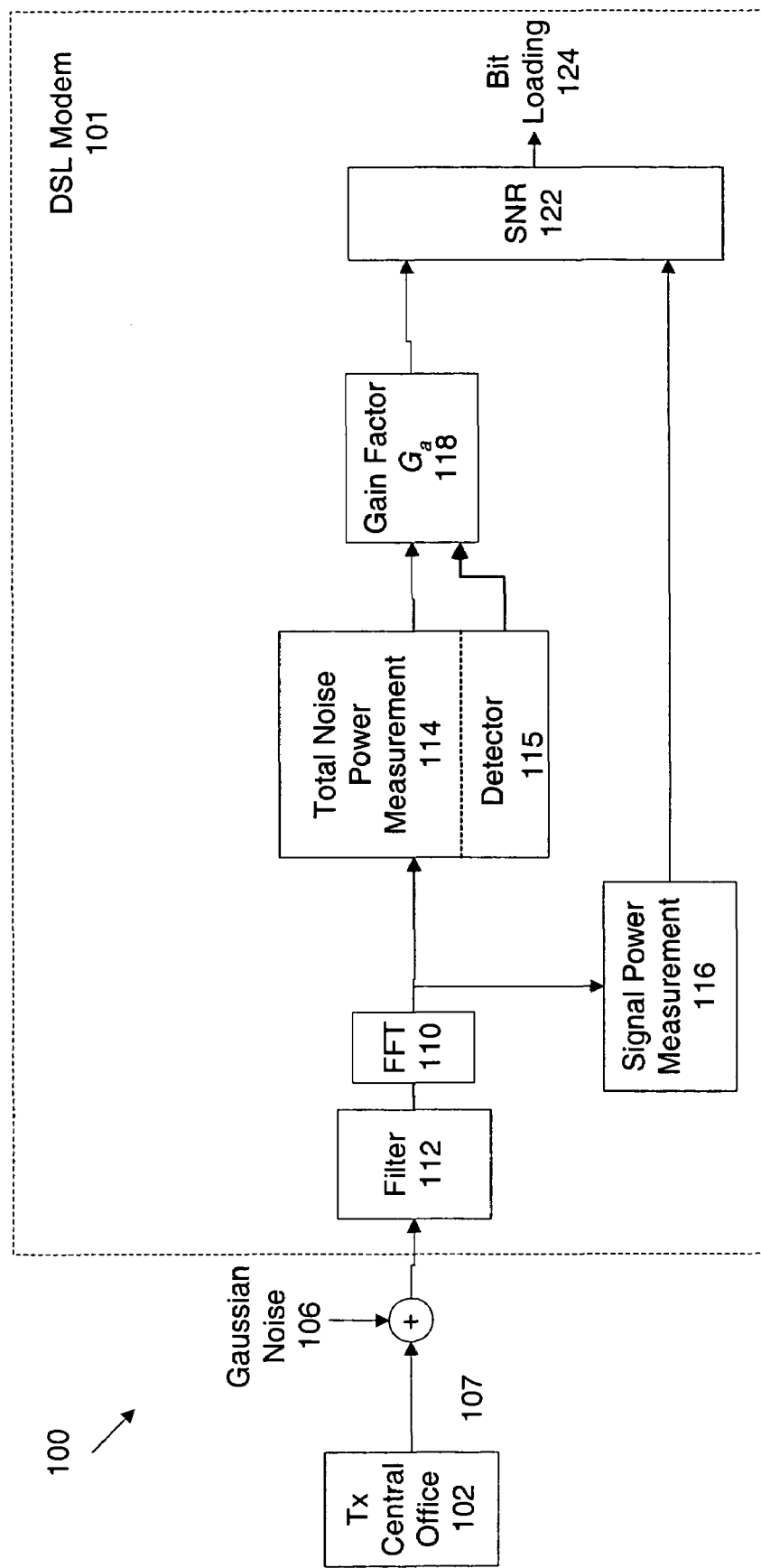
FIG. 1 illustrates a block diagram of an embodiment of a Discrete Multi-Tone (DMT) communication system containing a multi-tone receiver using a detector to detect whether an asymmetric Gaussian noise source is present in the background noise of a channel.

FIG. 1 illustrates a block diagram of an embodiment of a Discrete Multi-Tone (DMT) communication system containing a multi-tone receiver using a detector to detect whether an asymmetric Gaussian noise source is present in the background noise of a channel. The DMT communication system carries information from a transmitter 102 through a channel 107 (such as a telephone line) to a receiver 104, such as a DSL modem, over a number of sub-carriers i.e. tones. In an Asymmetric Digital Subscriber Line (ADSL) system, each tone may be modulated using a Quadrature Amplitude Modulation (QAM) scheme. The transmitter 102 at a central office transmits the multicarrier signal (e.g. a DMT signal) to the receiver 104 using the QAM scheme. As the multicarrier signal travels to the receiver 104 through a transmission channel 107, the signal is potentially corrupted by various noise sources 106.

The receiver 104 may contain various modules such as a Fast Fourier Transform block 110, block of Filters 112, a Total Noise Power Measurement block 114, Signal Power Measurement block 116, a Gain Factor block 118, as well as other modules.

In the receiver 104, the data for each tone/sub-channel is typically extracted from the time-domain data by taking the Fourier transform of a block of samples from the multi-tone signal. The Fast Fourier Transform block 110 receives the output of a block of filters 112. The Fast Fourier Transform block 110 transforms the data samples of the multi-tone signal from the time-domain to the frequency-domain, such that a stream of data for each sub-carrier may be output from the Fast Fourier Transform block 110. Essentially, the Fast Fourier Transform block 110 acts as a demodulator to separate data corresponding to each tone in the multiple tone signal. In one embodiment, processing of each sub-carrier may be performed in parallel or in series. The Fast Fourier Transform (FFT) block 110 may sample a sine and cosine of the amplitude of a tone over time to create the time domain data. The Fourier transform correlates the time domain data of the tone to the actual sine and cosine of the amplitude of the tone over time.

For each particular sub-carrier of the multicarrier signal, the Total Noise Power Measurement block 114 measures the power level of total noise for that sub-carrier.

The Total Noise Power Measurement block 114 measures noise present in the system by comparing the mean difference between the values of the received data to a finite set of expected data points that potentially could be received. The noise in the signal may be detected by determining the distance between the amplitude of the transmitted tone (at a given frequency and amplitude level) and the amplitude of the sine term and cosine term of the received tone to determine the magnitude of the error signal for that tone at that time. The noise present causes the error between the expected known value and the actual received value. The Total Noise Power Measurement block 114 may contain a detector 115.

The detector 115 detects whether asymmetric noise is present in the background noise over time. The detector 115 module generates a scatter plot of noise error over time. The detector 115 analyses a shape of the distribution of the noise error in the scatter plot. The detector 115 may measure the x axis and y-axis of the shape of the distribution of the noise error. If an asymmetric noise source is present, then the detector 115 triggers the equivalent noise power algorithm to alter the measured noise power level to model a noise power level of a symmetric noise source with a radius equal to the major axis of the shape of the distribution of the asymmetric Gaussian noise error in the scatter plot.

The error between the receive and transmit signal is usually depicted in a 2D scatter plot of error samples for each tone. The scatter plot has a horizontal x-axis and a vertical y-axis. The scatter plot illustrates the difference in amplitude between the known value of the transmitted data signal and the actual received signal over time. The Total Noise Power Measurement block 114 may store a finite set of expected data points that potentially could be received and compares the actual received amplitude value of the tone to these expected amplitude values. In the scatter plot, each point corresponds to a data point and represents the error of the in-phase and perpendicular components of the carrier.

Figure 2:
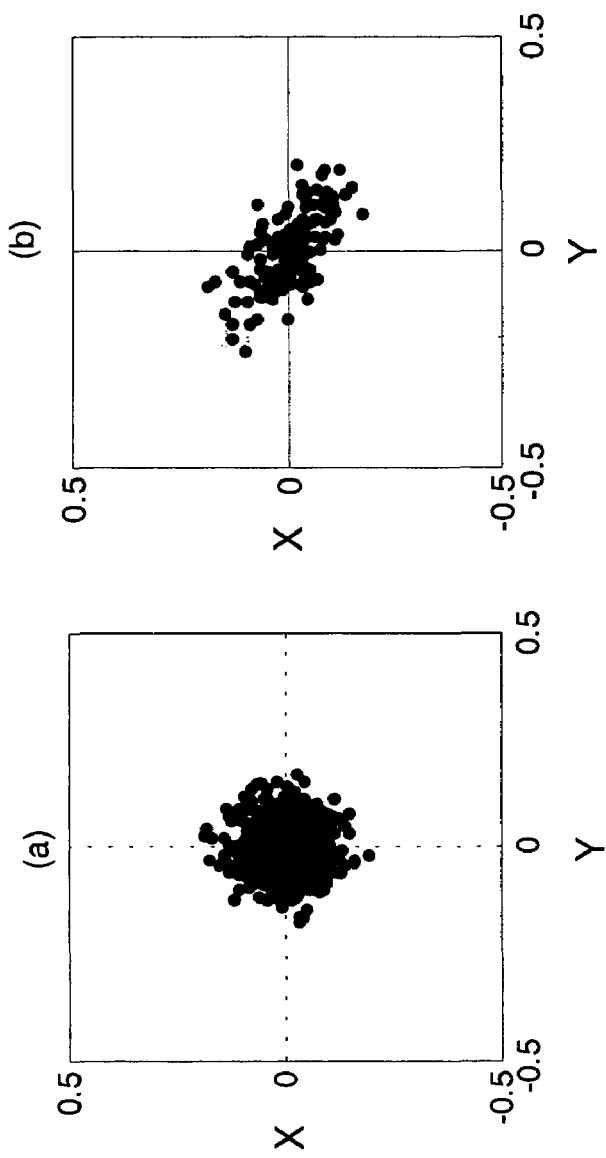
FIGS. 2a-2b illustrate examples of scatter plots of noise error over time for a symmetric noise source and an asymmetric noise source.
FIG. 2c illustrates an approximate outlined representation of the noise distribution of the asymmetrical Gaussian noise source over time illustrated in FIG. 2b.
Figure 2:
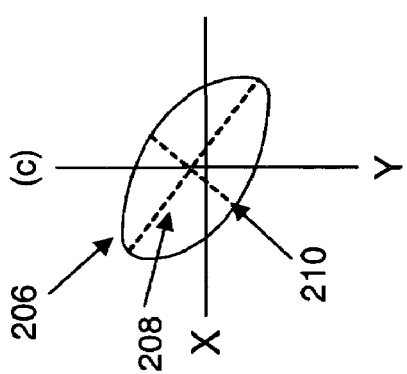

FIGS. 2a-2b illustrate examples of such scatter plots of noise error over time for a symmetric noise source and an asymmetric noise source. Plot 202 illustrates a scatter plot of the error signal when the sole source of error is a symmetric Gaussian noise source. The shape of the noise distribution over time is roughly a circle. Thus, the diameter of the symmetric Gaussian noise source in the horizontal x-axis is approximately the same as in the vertical y-axis. In contrast, the scatter plot for the error from an asymmetric and correlated noise source has a more complex characteristic, as illustrated in plot 204. The asymmetry has caused the elongation of distribution in one direction and the correlation has caused the rotation of primary axis. The asymmetric shape of the error has an example elliptical shape having a major axis and a minor axis. The major axis of the elliptical noise distribution of the asymmetrical Gaussian noise source over time has a significantly greater diameter than the diameter along the minor axis.

FIG. 2c illustrates an approximate outlined representation of the noise distribution of the asymmetrical Gaussian noise source over time illustrated in FIG. 2b. Overall, the shape of the noise distribution of the asymmetrical Gaussian noise source 206 is elliptical and the major axis 208 may have a significantly greater diameter than the minor axis 210.

Therefore, a simple symmetric Gaussian noise distribution may not accurately model the effects of the background noise. Specifically, using a simple power measurement for Signal to Noise Ratio (SNR) calculation underestimates the effect of noise and results in a higher bit-error rate. However, a more accurate model for background noise may take into account the long diameter of the asymmetric noise as the diameter of an equivalent symmetric noise source.

Referring to FIG. 1, the detector 115 may trigger the Total Noise Power Measurement module 114 to use an equivalent noise power algorithm to compensate for the power level of an asymmetric Gaussian noise source in the background noise. The output of the Total Noise Power Measurement module 114 feeds the gain module 118.

The gain module 118 may determine total noise power level for each tone in the multi-tone signal based upon the equivalent noise power algorithm. The gain module uses the equivalent noise power algorithm to compensate the noise power level if the detector 115 indicates that an asymmetric Gaussian noise source exists in the background noise. Gain Factor block 118 also determines a Gain Factor associated with the asymmetric noise source. The equivalent noise power is input into a Signal-to-Noise Ratio (SNR) block 122. The Signal Power Measurement block 116 measures the signal power for the sub-carrier, and inputs the result into the SNR block 122. The SNR block determines a signal-to-noise ratio, which is used to determine bit loading 124 for all sub-carriers.

As discussed, the detector 115 may rely on the fact that the power of an asymmetric noise source varies significantly along different axis. The power level along the strongest and weakest axis can be calculated from the parameters of the noise model.

The general form of the probability distribution function of a two-dimensional, zero-mean Gaussian noise source is expressed as:

$$P(x, y) = \frac{1}{2\pi\sqrt{\sigma_x^2\sigma_y^2 - \sigma_{xy}^2}} e^{-\frac{\sigma_y^2 x^2 - 2\sigma_{xy}xy + \sigma_x^2 y^2}{2(\sigma_x^2\sigma_y^2 - \sigma_{xy}^2)}} \quad (1)$$

where $\sigma_x$ and $\sigma_y$ are the standard deviation along the two main axes and $\sigma_{xy}$ is the correlation between the components of noise along the two axis. The general Gaussian noise source is completely defined with these 3 parameters. Note, $\sigma$ is the root mean square value and thus the standard deviation.

The total power level of noise may be calculated as:

$$P = \sigma_x^2 + \sigma_y^2 \quad (2)$$

For a symmetric Gaussian noise source, $\sigma_x$ and $\sigma_y$ are identical and for an uncorrelated noise source $\sigma_{xy}$ is zero. Therefore, a symmetric and uncorrelated noise source can be defined by only a single parameter. In such case, the power along all axes is identical for a symmetric noise source. Therefore, for a symmetric and uncorrelated Guassian noise source:

$$\sigma_x = \sigma_y = \sigma$$

$$\sigma_{xy} = 0$$

$$P = 2\sigma^2 \quad (3)$$

For an asymmetric, correlated noise source, power is not identical along all axes. The power value along the strongest and weakest axes can be calculated from the parameters of noise model as:

$$\overline{P} = \frac{(\sigma_x^2 + \sigma_y^2) + \sqrt{(\sigma_x^2 - \sigma_y^2)^2 + 4\sigma_{xy}^2}}{2} \quad (4)$$

$$\underline{P} = \frac{(\sigma_x^2 + \sigma_y^2) - \sqrt{(\sigma_x^2 - \sigma_y^2)^2 + 4\sigma_{xy}^2}}{2}$$

where $\overline{P}$ and $\underline{P}$ are the power values along the strongest and weakest axis, respectively. In the example of elliptical noise error scatter plot of FIG. 2b, the major axis of the ellipse would be the strongest axis.

From equation (4), if the power along the strongest and weakest axes is calculated to be identical, then the noise source is symmetrical and uncorrelated. If the power along the strongest and weakest axes is calculated to be different, then the noise source is asymmetrical and possibly correlated.

Given a set of noise measurement samples over time, one can estimate the parameters of the noise model in a maximum likelihood fashion as follows:

$$\hat{\sigma}_x^2 = \overline{x^2} = \frac{1}{N}\sum_{i=1}^{N} x_i^2 \quad (5)$$

$$\hat{\sigma}_y^2 = \overline{y^2} = \frac{1}{N}\sum_{i=1}^{N} y_i^2$$

$$\hat{\sigma}_{xy} = \overline{xy} = \frac{1}{N}\sum_{i=1}^{N} x_i y_i$$

where $x_i$ and $y_i$ are the two components of the $i^{th}$ noise measurement sample. The total number of measurement samples over time is assumed to be N.

Equivalent Noise Power

A bit-error occurs when the noise amplitude is large enough so that a received QAM constellation point crosses the so-called decision boundary and is decoded as a neighboring point. The decision boundaries normally cross midway between the adjacent constellation points. For a symmetric Gaussian noise source, the ratio of the minimum-distance of constellation points to the power level of noise determines the bit-error rate. For a fixed power level of noise, the higher the minimum distance is, the lower the probability of error is. Bit loading determines the number of bits a given tone may carry. When maintaining a target error rate for a given power level of noise, the constellation size may be chosen such that its minimum-distance is $$d_G^2 = \alpha P \quad (6)$$

where $d_G$ denotes the minimum-distance when the noise source is purely Gaussian, P is the power of the symmetric Gaussian noise source and $\alpha$ is a constant factor that depends only on the error rate and the channel coding scheme.

When the noise is not symmetric the error rate may be primarily dominated by the power of noise in its strongest axis. The outlying points on the strongest axis cause the most amount of error and are located the farthest from the center of the constellation as depicted by the scatter plot. Therefore, for the purpose of maintaining the probability of error at some target value, an equivalent noise power estimation can assume conservatively that the asymmetrical noise source is equivalent to a symmetric noise source with a power per axes ($\sigma^2$) equivalent to the power of the original noise source along the strongest axis. With this assumption, the power of the equivalent symmetric Gaussian noise source can be written as:

$$P_e = (\sigma_x^2 + \sigma_y^2) + \sqrt{(\sigma_x^2 - \sigma_y^2)^2 + 4\sigma_{xy}^2} \quad (7)$$

This corresponds to a boost in measured noise power by the following factor:

$$G_a = 1 + \frac{\sqrt{(\sigma_x^2 - \sigma_y^2)^2 + 4\sigma_{xy}^2}}{(\sigma_x^2 + \sigma_y^2)} \quad (8)$$

Therefore, for the purpose of bit-error rate analysis and bit-loading, an asymmetric, correlated noise source can be treated as a symmetric Gaussian noise source with the additional amplified power applied above.

Figure 3:
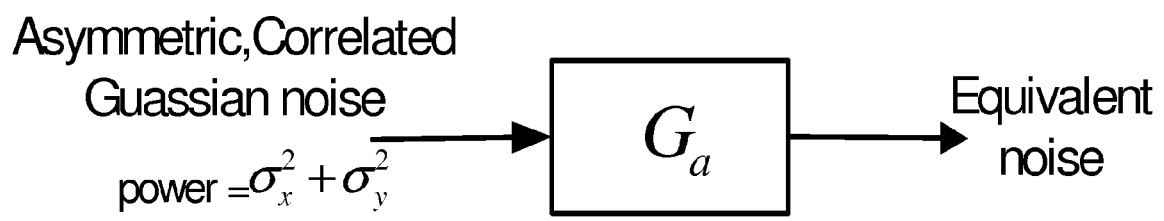
FIG. 3 illustrates a model for determining the equivalent total noise power of the asymmetrical, correlated Gaussian noise source.

FIG. 3 illustrates a model for determining the equivalent total noise power of the asymmetrical, correlated Gaussian noise source. The power of the noise is determined in the strongest axis and weakest axis. The summed powered is then multiplied by a gain factor to determine equivalent noise power level of that noise when an asymmetric noise source is present in the background noise. Note that the gain factor, $G_a$, is calculated to be unity for a symmetric, uncorrelated noise source. The equivalent total noise power from the gain module is input into a Signal-to-Noise Ratio calculation.

Figure 4A:
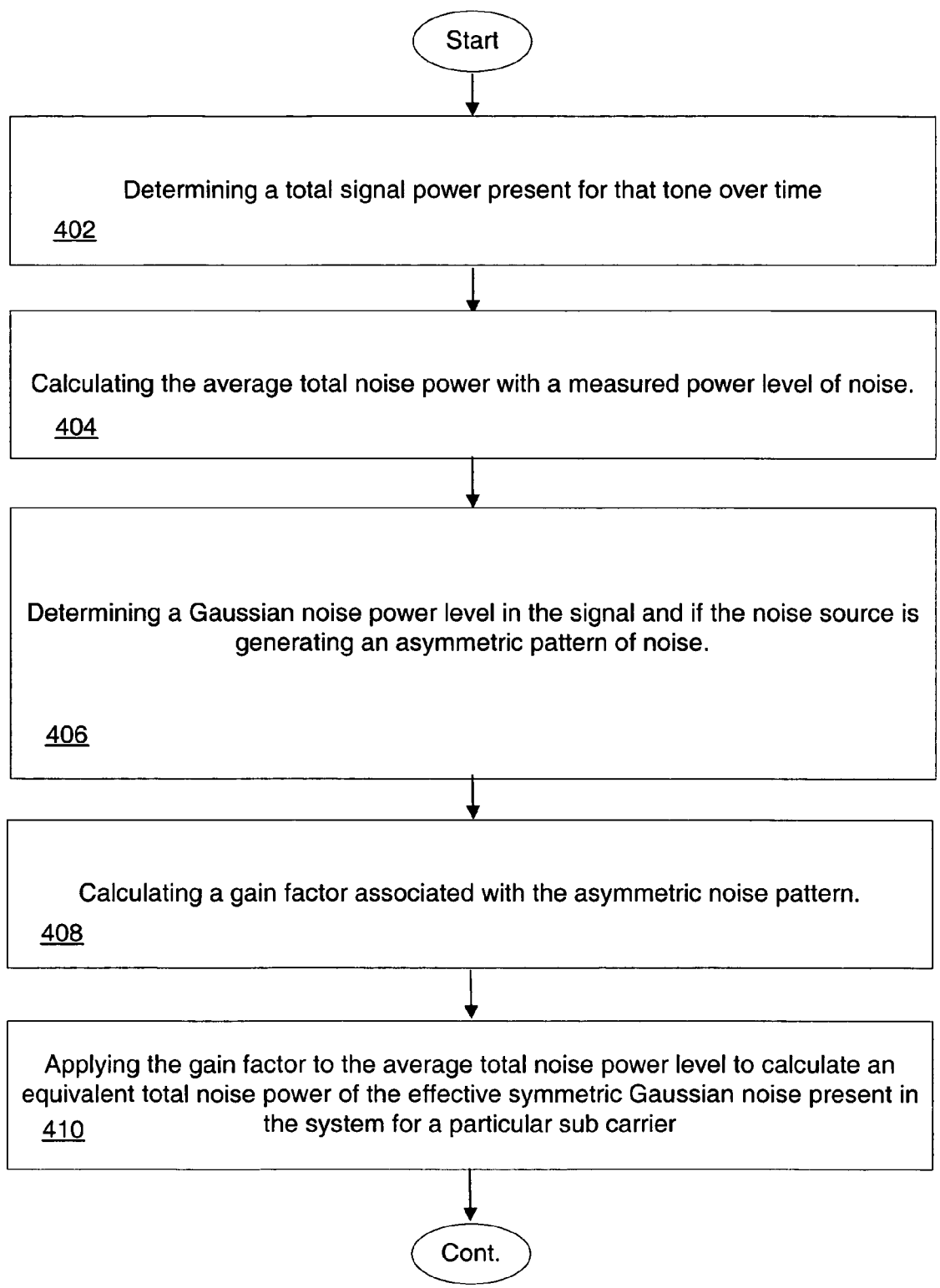
FIGS. 4a and 4b illustrates an embodiment a method of determining a signal to noise ratio in the presence of an asymmetric Gaussian correlated noise source.
Figure 4B:
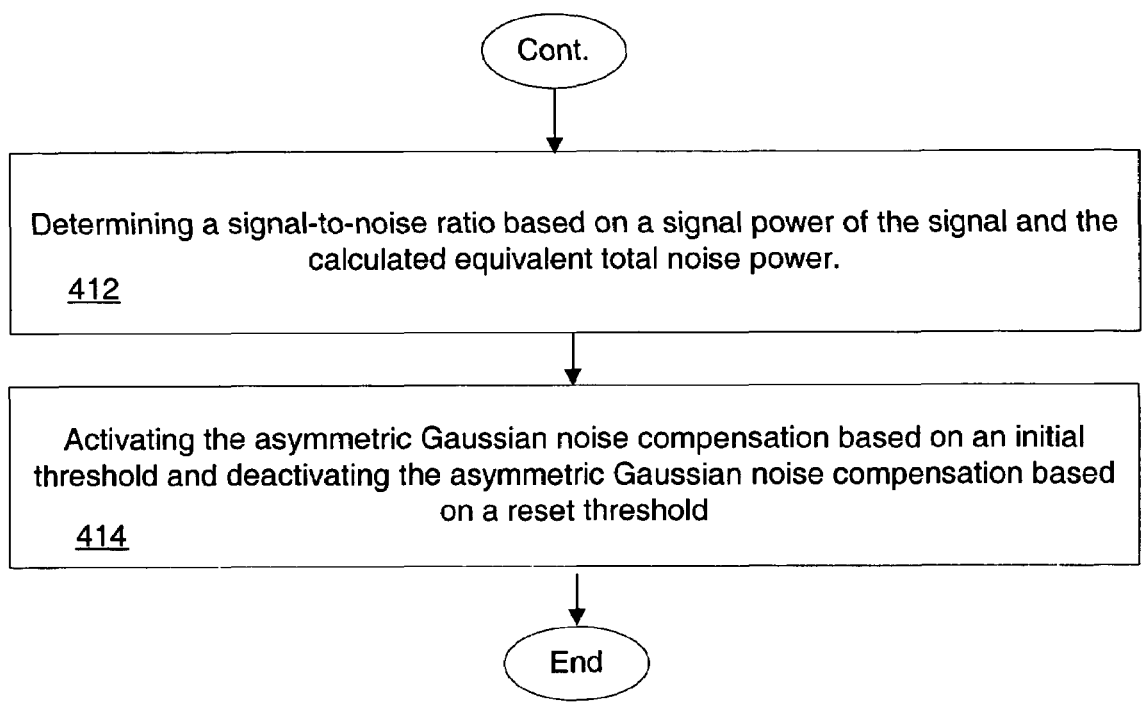

FIGS. 4a and 4b illustrates an embodiment a method of determining a signal to noise ratio in the presence of an asymmetric Gaussian correlated noise source.

The method 400 illustrated in FIGS. 4a and 4b constitutes a computer program made up of computer-executable instructions illustrated as blocks (operations) from 402 until 414. Describing the method by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the computer program is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIGS. 4a and 4b without departing from the scope of the invention and that no particular order is implied by the arrangement of blocks shown and described herein. For example, in one embodiment, processes represented by blocks may be performed in parallel.

Overall, the equivalent noise power algorithm may automatically calculate the equivalent noise power in a multi-tone communication system in the presence of an asymmetric, correlated Gaussian noise source. The error samples are measured over a finite time interval of N samples for each sub-channel. The two main components of the $i^{th}$ measurement are labeled $x_i$ and $y_i$. The measurement is updated regularly after a new set of error samples are collected.

In block 402, a receiver may determine a total signal power present for that tone over time.

In block 404, a receiver may measure a power level of noise for each tone in a multi-tone signal. The equivalent noise power algorithm may calculate the average total noise power with the measured power level of noise. The equivalent noise power algorithm may determine the x axis amplitude of an error signal of the tone over time. The equivalent noise power algorithm may determine the y axis amplitude of the error signal of the tone over time. The average total noise power may be calculated as:

$$P_s = \frac{1}{N}\sum_{i=1}^{N}(x_i^2 + y_i^2)$$

As discussed, the error samples are measured over a finite time interval of N samples for each sub channel. The two main components of the $i^{th}$ measurement are labeled $x_i$ and $y_i$. The measurement is updated regularly after a new set of error samples are collected.

In block 406, the noise power measurement algorithm may determine a Gaussian noise power level in the signal and if the noise source is generating an asymmetric pattern of noise. If an asymmetric, correlated noise source is present, then the average value of the x axis amplitude is significantly different than the average value of the y axis amplitude. The average difference noise power may be calculated as:

$$P_d = \frac{1}{N}\sum_{i=1}^{N}(x_i^2 - y_i^2)$$

Note, if the diameter of the noise distribution plot in the strongest axis is the same as the diameter of the noise distribution plot in the weakest axis, then the average power difference will calculate to be approximately zero. This indicates that a symmetric noise source is present and allows the equivalent noise power algorithm to be applied to solely symmetric noise sources to achieve the same results as the general form of the Gaussian noise model (2).

The equivalent noise power algorithm may calculate the average cross-correlation of how the strongest axis relates to the weakest axis as $$P_c = \frac{1}{N}\sum_{i=1}^{N}(x_i y_i)$$

The equivalent noise power algorithm determines the average values for the x axis amplitude, the y axis amplitude, and the correlation between the x axis amplitude and the y axis amplitude over time.

In block 408, the equivalent noise power algorithm may calculate a gain factor associated with the asymmetric noise pattern. The equivalent noise power algorithm may calculate the equivalent gain factor for noise present in the background when an asymmetric noise source is present as $$G_a = 1 + \frac{\sqrt{P_d^2 + 4P_c^2}}{P_s}$$

When the calculated gain factor $G_a$ is compared to the expected gain of (1), then if the gain factor is >1, then asymmetric noise is present in the background noise of the channel.

In block 410, the equivalent noise power algorithm may apply the gain factor to the total noise power level to calculate an equivalent total noise power of the effective symmetric Gaussian noise present in the system for a particular sub-carrier. The equivalent noise power algorithm may calculate the equivalent noise power when an asymmetric noise source is present as $$\sigma_e^2 = G_a P_s$$

The final value of equivalent total noise power, $\sigma_e^2$, can be used in any bit-loading algorithm that is designed specifically for Gaussian noise sources.

In block 412, the receiver may determine a signal-to-noise ratio based on a signal power of the signal and the calculated equivalent total noise power. As discussed, the calculated equivalent total noise power may be supplied to determine the SNR of a sub carrier. Subsequently, the SNR based on the equivalent total noise power may be used to determine the bit loading for that sub-carrier with asymmetric noise present on that channel. The resulting bit error rate remains at target value even if the noise source is asymmetrical and correlated. Thus, after the gain adjustment is made, the equivalent symmetric Gaussian noise power level may be supplied to a bit loading/error rate algorithm to be used in the algorithm when calculating the bit loading for that particular channel.

In block 414, the method 500 may be implemented more robustly by introducing a hysteresis basis on the calculated Gain Factor value. The equivalent noise power algorithm may determine if the gain factor exceeds a threshold amount. If so, the equivalent noise power algorithm activates the asymmetric Gaussian noise compensation based on an initial threshold and deactivates the asymmetric Gaussian noise compensation based on a reset threshold. Note, the initial threshold is greater than the reset threshold.

The result is an improved user experience, since fluctuation between asymmetric noise compensation and non-compensation is minimized. By way of example, consider an embodiment of the equivalent noise power algorithm that has a state in which the Gain Factor has a value of unity, e.g. $G_a=1$; in other words, asymmetric noise compensation is inactive. In one embodiment, a threshold value of about $G_a=1.1$ is used to activate the asymmetric noise compensation for the signal. In other words, until a Gain Factor is calculated as having a value of about 1.1 or greater, the Gain Factor used in calculating the equivalent noise power will remain at a value of unity, e.g. $G_a=1$. However, in one embodiment, once the Gain Factor is calculated to have a value of about $G_a=1.1$ or greater, the asymmetric noise compensation is activated, and the actual calculated Gain Factor value is used to calculate the equivalent noise power. In another embodiment, once in an asymmetric noise compensation state, a lower threshold is used for deactivation of asymmetric noise compensation. For example, in one embodiment, where asymmetric noise compensation is active (e.g. $G_a>1$), the compensation is deactivated (e.g. $G_a$ is assigned a value of unity) only when the determined Gain Factor has a value of about $G_a \cdot 1.03$. Thus, the algorithm may employ set and reset states when implementing the asymmetric noise compensation.

Thus, in one embodiment, from a state in which the Gain Factor has a value of unity, a first threshold is used to control when asymmetric noise compensation is activated. Once activated, a second threshold that is lower than the first threshold is used to control when the asymmetric noise compensation is deactivated. It will be appreciated that other values may be used as thresholds for hysteresis, and that other measurements may be used to control activation and deactivation of asymmetric noise compensation.

Embodiments of the present invention are applicable types of DSL systems, such as, but not limited to, ADSL, Rate Adaptive DSL (RADSL), Very High Bit Rate DSL (VDSL or VHDSL), High Bit Rate DSL (HDSL), Symmetric DSL (SDSL), ISDN DSL (IDSL), and Orthogonal Frequency Division Multiplexing (OFDM), as well as communications systems using other modulation techniques. Embodiments of the present invention are applicable to communication systems employing carrier signals in general.

The above description of illustrated embodiments of the invention, including what is described in the Abstract, is not intended to be exhaustive or to limit the invention to the precise forms or embodiments disclosed. While specific embodiments of, and examples for, the invention are described herein for illustrative purposes, various equivalent modifications are possible within the scope of the invention, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a multi-tone receiver to detect data in a multiple tone signal, the receiver having a detector module to measure a noise power level present in the system, and the detector module to detect for an asymmetric Gaussian noise source in the background noise, and
a gain module coupled to the multi-tone receiver to determine a total noise power level for a tone in the multi-tone signal based upon an equivalent noise power algorithm, the gain module to use the equivalent noise power algorithm to compensate the measured noise power level when the detector module indicates that the asymmetric Gaussian noise source exists in the background noise, wherein the detector module generates a scatter plot of noise error over time and the detector analyses a shape of the distribution of the noise error in the scatter plot, and wherein the equivalent noise power algorithm alters the measured noise power level to model a noise power level of a symmetric noise source with a radius equal to a major axis of the shape of the distribution of an asymmetric Gaussian noise error in the scatter plot.

2. A method, comprising:
measuring a power level of noise for a first tone in a multiple tone signal;
determining a Gaussian noise power level in the first tone and if a noise source is generating an asymmetric pattern of noise; and
applying a gain factor to the measured power level of the noise source with an asymmetric pattern of noise to be equivalent to that of a symmetric noise source with a standard deviation equivalent to the power of the noise source with an asymmetric pattern of noise along its strongest axes.

3. The method of claim 2, wherein the multiple tone carrier signal is a Digital Subscriber Line signal.

4. The method of claim 2, further comprising:
applying the gain factor to an average of the measured noise power level to calculate an equivalent total noise power of an effective symmetric Gaussian noise present in the system, if the noise source is generating the asymmetric pattern of noise.

5. The method of claim 2, further comprising:
calculating the gain factor associated with the asymmetric noise pattern; and
applying the gain factor to the measured noise power level to calculate an equivalent total noise power.

6. The method of claim 5, further comprising:
determining a signal-to-noise ratio based on a signal power of the first tone and the calculated equivalent total noise power.

7. The method of claim 2, wherein determining if the noise source is generating the asymmetric pattern of noise, comprises:
determining the x axis amplitude of a noise error signal of the tone;
determining the y axis amplitude of the noise error signal of the tone;
determining the value of the correlation between the x axis amplitude and the y axis amplitude components of error; and
determining the average power for the x axis amplitude, average power of the y axis, and the correlation between the x axis amplitude and the y axis amplitude over time, wherein when the average value of the x axis amplitude is significantly different than the average value of the y axis amplitude, then an asymmetric noise source is present.

8. The method of claim 7, wherein the average cross-correlation of how the x axis amplitude relates to the y axis amplitude may be calculated as $$P_c = \frac{1}{N}\sum_{i=1}^{N}(x_i y_i)$$

where the error samples are measured over a finite time interval of N samples for each sub channel, and the two main components of the ith measurement are labeled $x_i$ and $y_i$.

9. The method of claim 5, further comprising:
determining bit-loading based on the signal-to-noise ratio based on the equivalent total noise power.

10. The method of claim 5, further comprising:
determining if the gain factor exceeds a first threshold amount;
activating an asymmetric Gaussian noise compensation based on the first threshold; and
deactivating the asymmetric Gaussian noise compensation based on a second threshold, wherein the first threshold is greater than the second threshold.

11. A machine-readable medium storing executable instructions to a cause a device to perform operations, comprising:
measuring a power level of noise for a first tone in a multiple tone signal;
determining a Gaussian noise power level in the first tone and if a noise source is generating an asymmetric pattern of noise; and
applying a gain factor to the measured power level of the noise source with an asymmetric pattern of noise to be equivalent to that of a symmetric noise source with a standard deviation equivalent to the power of the noise source with an asymmetric pattern of noise along its strongest axes.

12. The article of manufacture of claim 11, wherein the stored instructions to cause the device to perform further operations, comprising:
calculating the gain factor associated with the asymmetric noise pattern; and
applying the gain factor to the measured noise power level to calculate an equivalent total noise power.

13. The article of manufacture of claim 12, wherein the stored instructions to cause the device to perform further operations, comprising:
determining a signal-to-noise ratio based on a signal power of the first tone and the calculated equivalent total noise power.

14. The article of manufacture of claim 11, wherein the multiple tone carrier signal is a Digital Subscriber Line signal.

15. The article of manufacture of claim 11, wherein the determining if the noise source is generating the asymmetric pattern of noise, comprises:
determining the x axis amplitude of a noise error signal of the tone;
determining the y axis amplitude of the noise error signal of the tone;
determining the value of the correlation between the x axis amplitude and the y axis amplitude components of error; and
determining the average values for the x axis amplitude, the y axis amplitude, and the correlation between the x axis amplitude and the y axis amplitude over time, wherein when the average value of the x axis amplitude is significantly different than the average value of the y axis amplitude, then an asymmetric noise source is present.

16. The article of manufacture of claim 15, wherein the average cross-correlation of how the x axis amplitude relates to the y axis amplitude may be calculated as $$P_c = \frac{1}{N}\sum_{i=1}^{N}(x_i y_i)$$

Where the error samples are measured over a finite time interval of N samples for each sub channel, and the two main components of the ith measurement are labeled $x_i$ and $y_i$.

17. The article of manufacture of claim 12, wherein the stored instructions to cause the device to perform further operations, comprising:
determining bit-loading based on the signal-to-noise ratio based on the equivalent total noise power.

18. The article of manufacture of claim 12, wherein the stored instructions to cause the device to perform further operations, comprising:
determining if the gain factor exceeds a first threshold amount;
activating an asymmetric Gaussian noise compensation based on the first threshold; and
deactivating the asymmetric Gaussian noise compensation based on a second threshold, wherein the first threshold is greater than the second threshold.

19. The article of manufacture of claim 11, wherein the stored instructions to cause the device to perform further operations, comprising:
applying the gain factor to an average of the measured noise power level to calculate an equivalent total noise power of an effective symmetric Gaussian noise present in the system, if the noise source is generating the asymmetric pattern of noise.

20. An apparatus, comprising:
means for detecting data in a multiple tone signal;
means for measuring a noise power level present in the system;
means for detecting for an asymmetric Gaussian noise source in a background noise;
means for determining a total noise power level for a first tone in the multiple tone signal based upon an equivalent noise power algorithm;
means for using the equivalent noise power algorithm to compensate the measured noise power level if the detector module indicates that the asymmetric Gaussian noise source exists in the background noise;
means for generating a scatter plot of noise error over time;
means for analyzing a shape of the distribution of the noise error in the scatter plot; and
means for altering the measured noise power level with the equivalent noise power algorithm to model a noise power level of a symmetric noise source with a radius equal to a major axis of the shape of the distribution of an asymmetric Gaussian noise error in the scatter plot.

* * * * *